United States Patent [19]

Keidar

[11] Patent Number: 5,046,214
[45] Date of Patent: Sep. 10, 1991

[54] SPOOL CONSTRUCTION AND OIL DIPSTICK WIPER INCLUDING SUCH CONSTRUCTION

[75] Inventor: Itzhak Keidar, Tel Aviv, Israel

[73] Assignee: Penta Inventions, Ltd., Tel Aviv, Israel

[21] Appl. No.: 470,204

[22] Filed: Jan. 25, 1990

[51] Int. Cl.⁵ .............................................. B65H 75/14
[52] U.S. Cl. ................................ 15/210 B; 242/118.4
[58] Field of Search ............ 15/210 B; 242/118, 118.1, 242/118.4, 118.6, 118.61, 118.7

[56] References Cited

U.S. PATENT DOCUMENTS

| 1,468,122 | 9/1983 | May | 15/210 B |
| 3,642,223 | 2/1972 | Feichtinger | 242/118.4 X |
| 3,905,561 | 9/1975 | Kelch et al. | 242/118.61 X |
| 3,966,139 | 6/1976 | Terpak | 242/118.7 |
| 4,068,808 | 1/1978 | King | 242/118.4 |
| 4,739,945 | 4/1988 | Yokoe | 242/118.61 X |

FOREIGN PATENT DOCUMENTS 316783  4/1934  Italy .................................. 15/210 B Primary Examiner—Chris K. Moore
Attorney, Agent, or Firm—Benjamin J. Barish

[57] ABSTRACT

A spool, particularly useful as an oil dipstick wiper, includes two like spool sections each formed with an axially-extending hollow stem terminating in a plurality of jaws permitting the two sections to be assembled together with a snap fit, with a wiper element carried by the stem of each section.

19 Claims, 1 Drawing Sheet

12
SPOOL CONSTRUCTION AND OIL DIPSTICK WIPER INCLUDING SUCH CONSTRUCTION

BACKGROUND OF THE INVENTION

The present invention relates to a spool construction. The invention is particularly applicable with respect to a spool-type oil dipstick wiper, and is therefore described below with respect to this application.

Various types of oil dipstick wiper devices have been proposed to facilitate wiping the oil dipstick conventionally provided on motor vehicles for measuring the quantity of oil in the oil reservoir of the engine. Italian Patent 316783 of 1932 describes a spool-type oil dipstick wiper including a pair of wiper elements contained within a spool-shaped housing such that the oil dipstick may be inserted between the two wiper elements in order to wipe the dipstick clean of oil. Insofar as I am aware, however, such a wiper device has not found widespread use, probably because the cost for manufacturing and assembling the device did not make it attractive to the public.

OBJECTS AND SUMMARY OF THE INVENTION

An object of the present invention is to provide a spool construction which may be manufactured and assembled in volume and at low cost, and which is particularly, but not exclusively, useful in oil dipstick wiper devices.

Another object of the invention is to provide a spool-type oil dipstick wiper device including the novel spool construction and enabling such devices to be produced in volume and at low cost.

According to one aspect of the present invention, there is provided a spool comprising two like spool sections each including an axially-extending hollow stem terminating in a plurality of circumferentially-spaced jaws. The jaws of one section fit into the spaces between the jaws of the other section to define the hub of the spool when the two sections are assembled together. The outer faces of the jaws are formed with outer shoulders; and the inner faces of the hollow stems are formed with inner shoulders, such that, when the two sections are assembled together by inserting the clamping jaws of one section into the hollow stem of the other section, the inner shoulder of the stem of one section is engageable by the outer shoulders of the jaws of the other section to firmly retain the two sections in assembled relation.

In the preferred embodiment of the invention described below, each of the jaws is elastic so as to be bendable towards and away from the axis of the spool, when the two sections are assembled together; also, each of the jaws is formed with a tapered tip to its respective outer shoulder permitting the two sections to be assembled together by a snap fit.

According to another aspect of the invention, there is provided a spool type oil dispstick wiper device of the above spool construction and further including a wiper element received on each of the axially-extending stems of the two spool sections, such that when the two sections are assembled together, a dipstick may be inserted into the housing and passed between the two wiper elements for wiping the oil from the dipstick.

Spools in general, and spool-type oil dipstick wipers in particular, constructed in accordance with the foregoing features may be produced and assembled in volume and at low cost.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
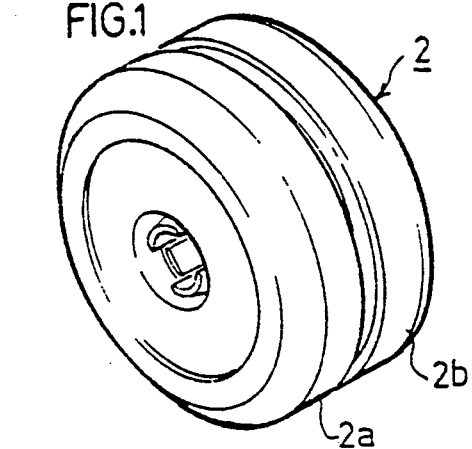
FIG. 1 is a perspective view illustrating one form of spool-type oil dipstick wiper constructed in accordance with the present invention.

The drawings illustrate a spool-type oil dipstick wiper device to facilitate wiping the dipstick commonly provided for measuring the level of the oil in a motor vehicle engine. The device includes a housing, generally designated 2, formed of two like housing sections 2a, 2b assembled together with a wiper element 3 carried by each section such that the dipstick (not shown) may be inserted between the two wiper elements 3 and moved with respect to them in order to wipe the dipstick of the oil thereon. Each housing section 2a, 2b further includes a spacer element 4, for spacing the wiper element from the inner face of the respective housing section 2a, 2b, to define a compartment 5a, 5b for receiving excess oil wiped from the dipstick.

Figure 2:
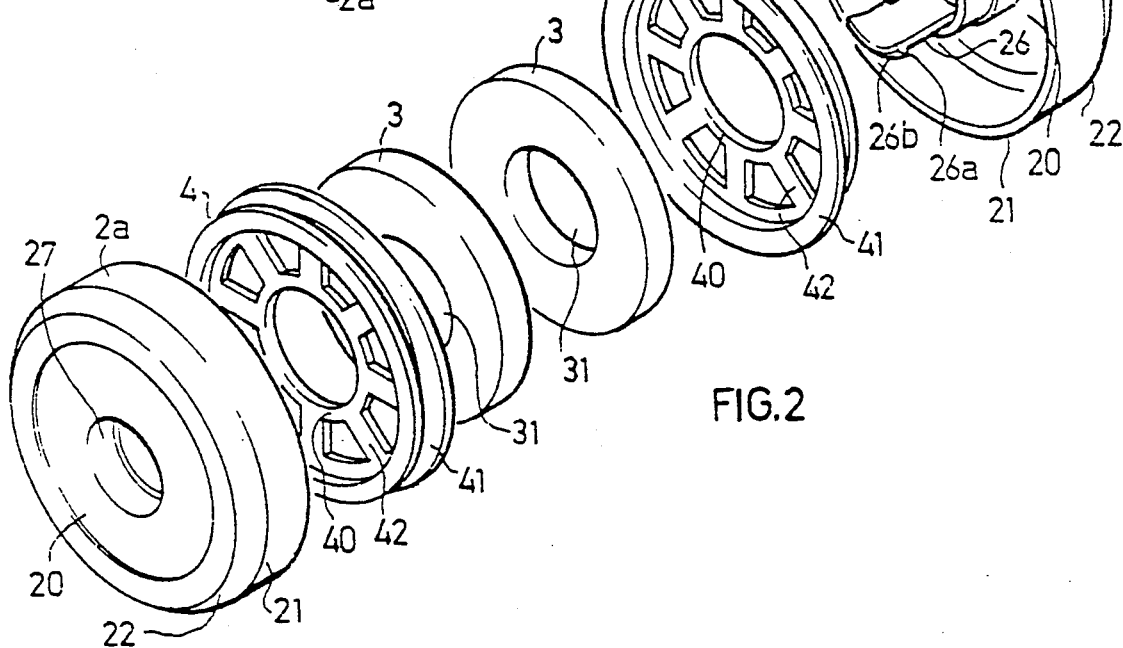
FIG. 2 is an exploded perspective view illustrating the elements of the wiper of FIG. 1.
Figure 3:
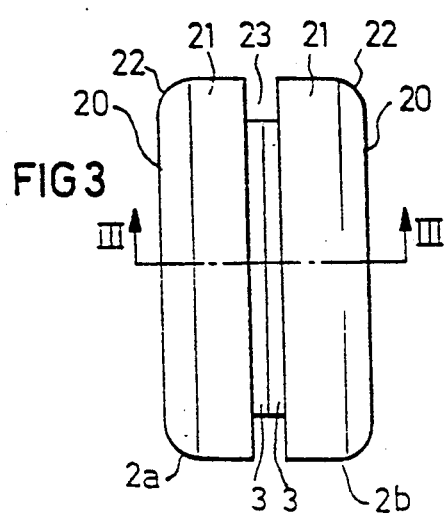
FIG. 3 is a side elevational view of the wiper of FIG. 1.

The two housing sections 2a, 2b are of like construction and include like elements, as more particularly illustrated in FIG. 2.

Each of the two housing sections 2a, 2b includes a circular wall 20 formed at its outer periphery with an annular flange 21 joined to the respective wall to a curved juncture 22. In the assembled condition of the two housing sections 2a, 2b, the inner edges of the two flanges 21 are spaced from each other to define an annular gap 23 for receiving the dipstick.

Figure 4:
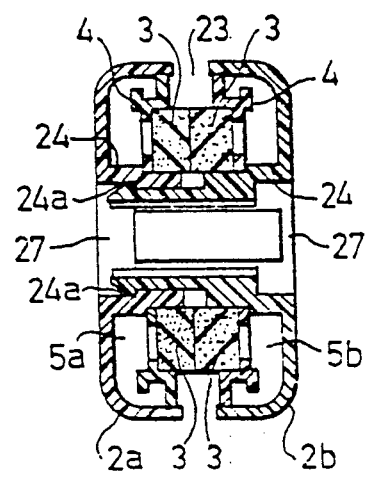
FIG. 4 is a transverse sectional view along line IV—IV of FIG. 3.

Each of the two circular walls 20 is formed with an axially-extending hollow stem 24 terminating in a pair of circumferentially-spaced jaws 25, 26. The inner face of the hollow stem 24 is formed with an inner shoulder 24a (FIG. 4). The outer faces of the two jaws are formed with annular shoulders 25a, 26a, and with tapered tips 25b, 26b, terminating at the latter shoulders. The hollow stem 24 of each section communicates with an opening 27 formed centrally of wall 20 of each section.

The hollow stem 24 of each section is of cylindrical configuration, and the inner shoulder 24a formed on the inner surface of each stem is of annular configuration. In addition, the two jaws 25, 26 of each section have a curvature such that, when the two sections are assembled together, the two jaws of each section fit into the spaces between the two jaws of the other section so as to define a cylindrical hub.

Spacer element 4 provided in each housing section 2a, 2b is received with a friction fit in its respective section and is engageable with the inner face of the wiper element 3 included in the section so as to define compartments 5a, 5b for receiving any excess oil from the wiper element. Thus, each spacer element 4 includes an inner ring 40 of an inner diameter substantially equal to the outer diameter of its respective stem 24, and an outer ring 41 having an outer diameter substantially equal to the inner diameter of the flange 21 in its respective housing section. Each spacer element 4 further includes a plurality of radially-extending ribs 42 connecting together the two rings 40, 41, but providing spaces for the passage of oil from the wiper element 3 to its respective compartment 5a, 5b. The outer ring 41 is somewhat thicker than the inner ring 40 or the ribs 42, so that the outer ring projects axially from the inner ring 40 and ribs 42 to thereby space the inner face of the wiper element 3 from the latter ring and ribs.

Wiper element may be made of any suitable oil-absorbing material, such as porous rubber. It is of annular configuration, formed with a central opening 31 slightly larger than the outer diameter of its respective stem 24, and of an outer diameter slightly larger than the inner diameter of the outer ring 41 of spacer element 4, so as to be engaged by that spacer element. The engagement of the outer ring 41 with the inner face of the wiper element 3 effectively prevents any oil accumulating within compartments 5a, 5b to leak outwardly through the annular gap 23 of the housing.

In assembling the wiper device, each spacer element 4 is inserted with a friction fit into its respective housing section 2a, 2b, and then each circular wiper element 3 is loosely applied over the hollow stem 24 of its respective section. The two housing sections are then assembled together with a snap fit by passing the jaws 25, 26 of one section into the spaces between the jaws of the other section, until shoulders 25a, 26a of the jaws snap over the annular shoulder 24a formed on the inner face of each of the hollow stems 24.

The parts are so-dimensioned that when the two housing sections 2a, 2b are thus assembled, the confronting faces of the flanges 21 of the two housing sections 2a, 2b are spaced from each other so as to define the annular gap 23 for receiving the dipstick to be wiped by the wiper elements 3 within the housing. Any excess oil not absorbed by the wiper elements 3 is retained within the two compartments 5a, 5b. The engagement of the outer periphery of each wiper element 3 by the outer spacer ring 41 effectively seals the compartment from leaking oil to the atmosphere via the annular gap 23.

It will thus be seen that the oil dipstick wiper device illustrated in the drawings may be constructed of a few simple parts which many be manufactured and assembled in volume and at low cost.

While the invention has been described with respect to one preferred embodimetn, it will be appreciated that many other variations, modifications and applications of the invention may be made.

What is claimed is:

1. A spool comprising:
    two like spool sections each including an axially-extending hollow stem terminating in a plurality of jaws separated from each other by spaces around the circumference of the stem;
    the jaws of one section fitting into the spaces between the jaws of the other section to define the hub of the spool when the two sections are assembled together;
    the outer faces of the jaws being formed with outer shoulders; and
    the inner faces of the hollow stems being formed with inner shoulders, such that, when the two sections are assembled together by inserting the jaws of one section into the spaces between the jaws in the hollow stem of the other section, the inner shoulder of the stem of one section is engageable by the outer shoulders of the jaws of the other section to firmly retain the two sections in assembled relation.

2. The spool according to claim 1, wherein each of said hollow stems is of cylindrical configuration, and said inner shoulder formed on its inner face is of annular configuration.

3. The spool according to claim 2, wherein each of said sections includes two jaws having a curvature such that the four jaws of the two sections, when assembled together, define a hub of cylindrical configuration.

4. The spool according to claim 1, wherein each of said jaws is elastic so as to be bendable towards or away from the axis of the spool, and is formed with a tapered tip to its respective outer shoulder permitting the two sections to be assembled together by a snap fit.

5. The spool according to claim 1, wherein each of said spool sections is formed with a central opening coaxial with its respective hollow stem.

6. The spool according to claim 1, wherein each of said sections includes a wiper element for receiving and wiping an oil dipstick between them.

7. The spool according to claim 6, wherein each of said sections further includes a spacer member for spacing the inner face of the wiper element from the inner face of the respective section to thereby form a compartment for receiving excess oil.

8. The spool according to claim 7, wherein said spacer member comprises:
    an inner ring receivable over the hollow stem of the respective section;
    an outer ring engageable with the inner surface of the respective wiper element along its outer periphery; and
    a plurality of radially-extending ribs joining the two rings together.

9. The spool according to claim 8, wherein said outer ring projects in the axial direction from said ribs to space the inner face of the wiper element axially from the outer face of the ribs.

10. The spool according to claim 8, wherein said two sections are formed with a peripheral flange extending axially towards each other when assembled together and defining a gap between them for receiving the oil dipstick to be wiped, the outer ring of the spacer element of each section being received with a friction fit with respect to the inner face of the flange in the respective section.

11. A spool-type oil dipstick wiper device, comprising:
    two like spool sections each including an axially-extending hollow stem terminating in a plurality of circumferentially-spaced jaws;
    a wiper element received on the stem of each of said two spool sections;
    the jaws of one section fitting into spaces between the jaws of the other section to define the hub of the spool when the two sections are assembled together;
    the outer faces of the jaws being formed with outer shoulders; and
    the inner faces of the hollow stems being formed with inner shoulders, such that, when the two sections are assembled together by inserting the jaws of one section into the hollow stem of the other section, the inner shoulder of the stem of one section is engageable by the outer shoulders of the jaws of the other section to firmly retain the two sections in assembled relation.

12. The device according to claim 11, wherein each of said sections further includes a spacer member for spacing the inner face of the wiper element from the inner face of the respective section to thereby form a compartment for receiving excess oil.

13. The device according to claim 12, wherein said spacer member comprises:
an inner ring receivable over the hollow stem of the respective section;
an outer ring engageable with the inner surface of the respective wiper element along its outer periphery; and
a plurality of radially-extending ribs joining the two rings together.

14. The device according to claim 13, wherein said outer ring projects in the axial direction from said ribs to space the inner face of the wiper element axially from the outer face of the ribs.

15. The device according to claim 13, wherein said two sections are formed with a peripheral flange extending axially towards each other when assembled together and defining a gap between them for receiving the oil dipstick to be wiped, the outer ring of the spacer element of each section being received with a friction fit with respect to the inner face of the flange in the respective section.

16. The device according to claim 11, wherein each of said hollow stems is of cylindrical configuration, and said inner shoulder formed on its inner face is of annular configuration.

17. The device according to claim 11, wherein each of said sections includes two jaws having a curvature such that the four jaws of the two sections, when assembled together, define a hub of cylindrical configuration.

18. The device according to claim 11, wherein each of said jaws is elastic so as to be bendable towards or away from the axis of the spool, and is formed with a tapered tip to its respective outer shoulder permitting the two sections to be assembled together by a snap fit.

19. The device according to claim 11, wherein each of said spool sections is formed with a central opening coaxial with its respective hollow stem.

* * * * *